United States Patent

[11] 3,586,393

[72] Inventor William G. Myers
162 Monee Road, Park Forest, Ill. 60466
[21] Appl. No. 793,397
[22] Filed Jan. 23, 1969
[45] Patented June 22, 1971

[54] CONVEYOR STRUCTURE
7 Claims, 8 Drawing Figs.
[52] U.S. Cl. .................................................. 305/35 R,
305/47, 198/189, 305/52, 305/57
[51] Int. Cl. ................................................. B62d 55/22
[50] Field of Search .......................................... 305/39, 47,
48, 49, 57; 74/250, 250 C; 198/189

[56] References Cited
UNITED STATES PATENTS
1,488,629 4/1924 Wick ............................ 305/24

| 1,570,014 | 1/1926 | Stevens | 74/250 |
|---|---|---|---|
| 1,826,351 | 10/1931 | Hoefen | 198/189 UX |
| 1,944,374 | 1/1934 | Schmidtke | 198/189 X |
| 1,953,388 | 4/1934 | Bettin | 305/48 X |
| 2,003,528 | 6/1935 | Best | 305/57 |
| 2,193,283 | 3/1940 | Harberson | 305/58 |
| 2,339,886 | 1/1944 | Shannon | 180/5 |
| 2,602,345 | 7/1952 | Braumiller | 198/189 X |

Primary Examiner—Richard J. Johnson
Attorney—Charles S. Penfold

ABSTRACT: The invention involves providing cooperative areas on a sprocket and a chain for stabilizing and improving the operation of the latter.

INVENTOR
WILLIAM G. MYERS
BY Charles S. Penfold
ATTORNEY

INVENTOR
WILLIAM G. MYERS
BY
Charles S. Penfold
ATTORNEY

CONVEYOR STRUCTURE

The subject invention relates generally to a sprocket and chain assembly, contacting areas or surfaces therebetween, and between components of the chain.

A significant object of the invention is to provide a sprocket and chain assembly in which the contacts between the chain and teeth of the sprocket are held to a minimum to materially reduce friction and inertia as compared to conventional assemblies.

An important object of the invention is to provide a sprocket with a pair of annular surfaces extending radially outward from its teeth and a chain having link means preferably in the form of shoes which are provided with inner arcuate surfaces which conform to and engage the annular surfaces of the sprocket whereby to promote stabilization of the chain for conveyor or traction purposes.

Another significant object of the invention is to provide a chain in which the link means or shoes, above referred to, are of channel construction and have bottom walls which substantially cover or overlie the teeth of the sprocket and sidewalls which straddle the teeth and inner edge of these sidewalls are provided with the arcuate surfaces, above referred to.

A specific object of the invention to to provide shoes in which the bottom walls may serve as conveyor pads or as traction means and the lengths of the shoes are predetermined so that opposed ends or edges thereof will intimately engage or abut one another whereby to assist in maintaining a chain comprised of the shoes in a substantially straight condition.

Another specific object of the invention is to provide a plural or tandem chain assembly in which shoes of the chains may be connected by cross-traction elements.

A further important object is to provide a unique arrangement whereby adjacent pairs of shoes of a chain are connected together by side members or links, certain of which have offsets which are adapted to slidably engage and ride on a straight way or track disposed alongside the chain for the purpose of stabilizing movement of the chain to maintain at least a portion thereof in a straight condition.

An additional object of the invention is to provide a chain having link means or shoes which are connected by side members or links and opposed or sidewalls of the shoes are provided with offsets or abutments which may be engaged by the side links for stabilizing and assisting to maintain at least a portion of the chain in a substantially straight condition.

A particular object of the invention is to provide a chain comprising a plurality of link means, side members, cross-pins extending through the link means and side members affording pivotal connections therebetween, and means located adjacent said pivotal connections for limiting pivotal movement between said link means and said side members.

A further specific object is to provide a chain in which the shoes may be constructed of plastic material and which are reinforced by metallic bearing inserts.

Additional objects and advantages of the invention will become apparent after the description hereinafter set forth is considered in conjunction with the drawings annexed hereto.

Figure 1:
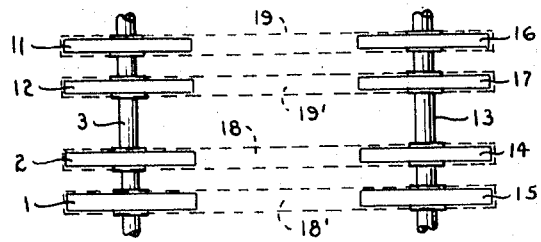
FIG. 1 is a top plan view of an assembly comprising chains carried by sprockets.
Figure 2:
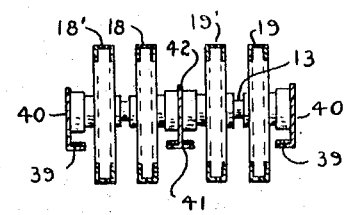
FIG. 2 is an end elevational view of the assembly shown in FIG. 1, with portions thereof in section.
Figure 4:
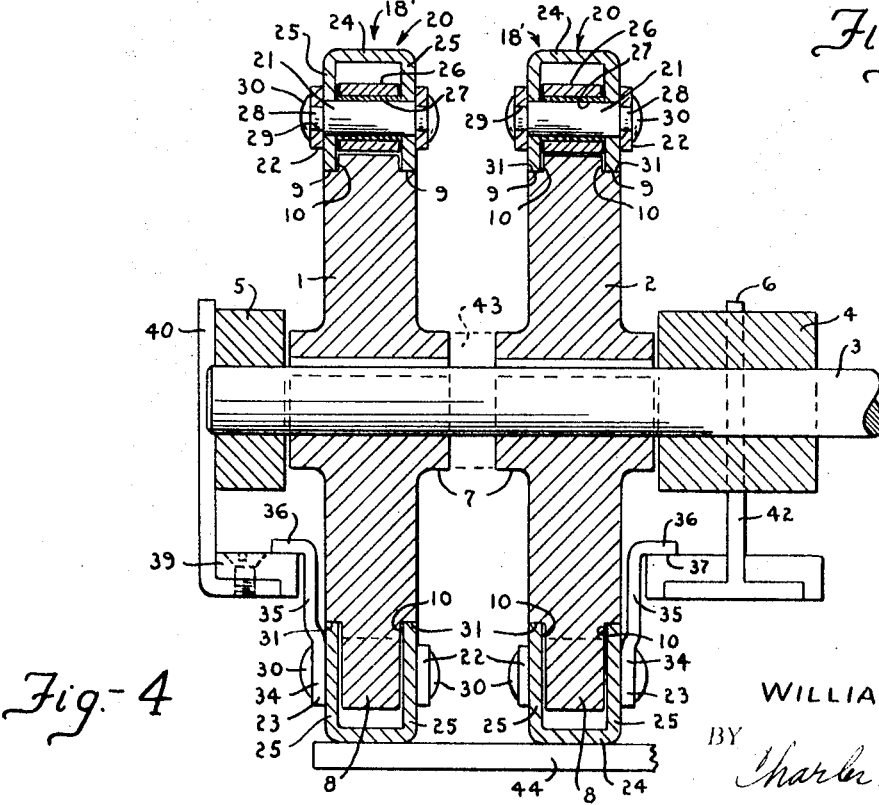
FIG. 4 is a vertical section taken substantially on line 4—4 of FIG. 3 showing other details of the structure.

Referring particularly to FIGS. 1, 2 and 4 of the drawing, numerals 1 and 2 represent a pair of sprockets keyed in axially spaced relationship to a shaft 3 rotatably supported in a pair of fixed bearings 4 and 5 mounted on a stationery frame 6 or part of a chassis of a vehicle not shown. Each of the sprockets has a hub 7, circumferentially spaced teeth 8, and a pair of corresponding annular recesses defining a pair of annular surfaces 9 which extend axially outward from the base of the teeth and a pair of parallel radially extending surfaces 10 which merge with side faces of the teeth. A second pair of sprockets 11 and 12, corresponding to the sprockets 1 and 2, are also fixed on the shaft 3 and a drive shaft 13 parallel to the shaft 3 has a pair of sprockets 14 and 15 and a pair of sprocket 16 and 17 fixed thereon. A pair of chains 18 and 18' respectively connect the sprockets 2 and 14 and 1 and 15 and another pair of chains 19 and 19' respectively connect the sprockets 11 and 6 and 12 and 17.

Each of the chains preferably includes a plurality of corresponding link means or elements preferably in the form of shoes generally designated 20, cross-pins 21 and side links 22 and 23 which are connected to and carried by the cross-pins. More specifically, each of the link means in preferably constructed in the form of a channel and includes a bottom wall 24 and a pair of corresponding opposed or sidewalls 25. The cross-pins extend through apertures provided therefor in the extremities of the shoes and through tubular sleeves or rollers 26 and tubular bearings 27 therefor. Otherwise expressed, the rollers and bearing are located between the sidewalls 25 of the shoe and carried by the cross-pins. The rollers and/or the bearings may rotate relative to the cross-pins. The cross-pins have reduced ends 28 which extend through apertures 29 provided therefor in the extremities of the links and are upset at 30 for permanently maintaining the shoes and associated components operatively connected.

Figure 3:
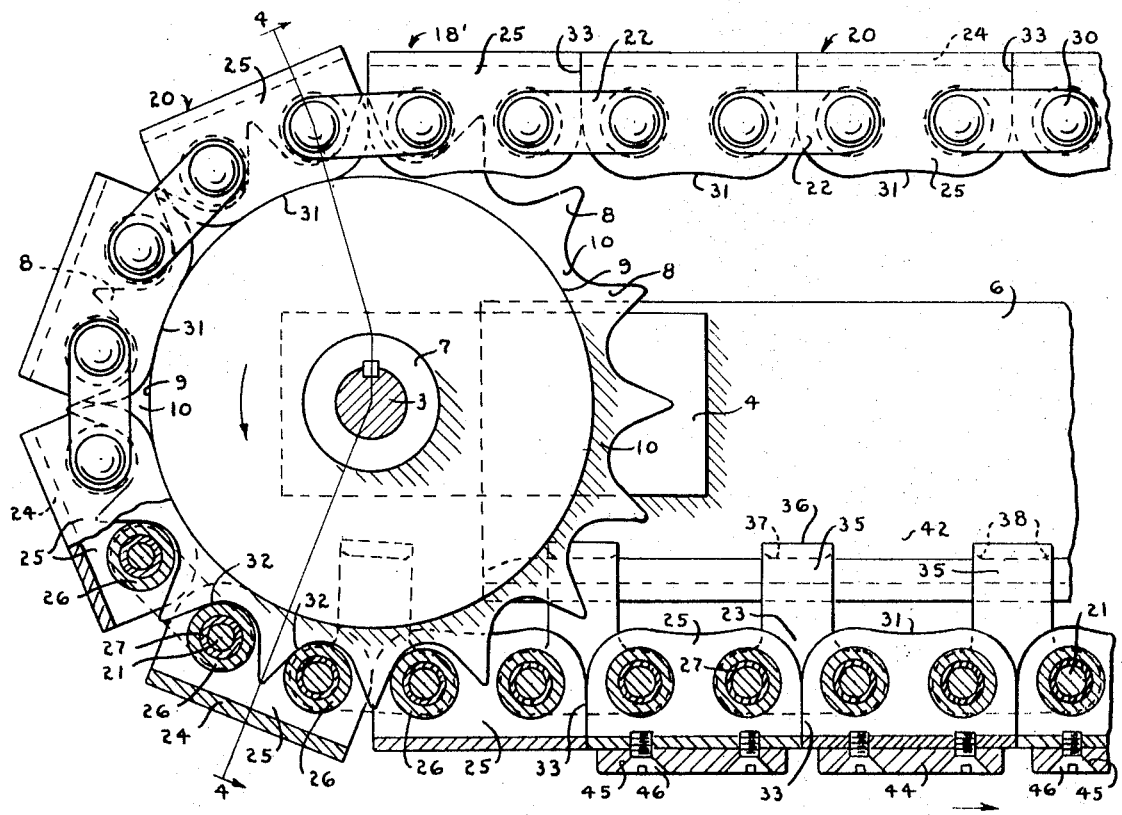
FIG. 3 is an enlarged partial side elevational view of the assembly shown in FIG. 1, with portions broken away to illustrate details of the construction.

When the chains are mounted on the sprockets as shown, the shoes substantially cover the engaged teeth and adjacent portions of the sprockets. Attention is directed to the fact that inner side edges of the sidewalls of the shoes are preferably provided with arcuate surfaces 31 which are adapted to engage the annular surfaces 9 on the sprockets and so that the inner surfaces of the sidewalls may engage the radially extending annular surfaces 10 as evidenced in FIG. 3 and 4. Otherwise expressed, an annular portion and teeth of each sprocket are located between the sidewalls of the shoes of each chain. Of appreciable significance is the further fact that the relative sizes or dimensions of the shoes and sprocket are such that the rollers 26 of the shoes are maintained in a predetermined spaced relationship with respect to the teeth of the sprocket so that when, for example, the chains and sprockets are moved in the direction of the arrows in FIG. 3, the rollers will only contact the forward faces of the teeth as indicated at 32. This unique organization of providing points or lines of contact between the rollers of the chain and teeth materially reduces the friction and wear therebetween.

Attention is also directed to the fact that the lengths of the shoes are predetermined so that opposed ends thereof will abut one another as indicated at 33, particularly when a length of the chain is in a straight condition. It will be noted that the extremities of the sidewalls of the channel are rounded as indicated at 70 to provide clearance when a length or portion of a chain is engaged with a sprocket as evidenced in FIG. 3. This combination of contacting lines, points or surfaces between the shoes and sprocket and between the shoes serves to stabilize the position of the chains in relation to the sprockets and minimize wear between the chains and sprockets. In other words, the shoes of each chain are not only maintained in effective contacting relation with one another and with the sprocket during at least certain positions of their travel but any vibrations and noise therebetween is appreciably reduced.

The side links 23 may be designed and constructed in various ways but as depicted, each link is preferably of generally T-shape and includes a portion 34 through which the crosspins 21 extend, a transverse offset 35 which is adapted to clear a sprocket and a lateral outwardly extending continuation 36 provided with a straight bearing surface 37 having inclined approaching end surfaces 38. The chains 18' and 19 are additionally stabilized by the links 23 which are so positioned that their bearing surfaces 37 will respectively engage straight tracks or ways 39 carried by fixed hangers 40 and the bearing surfaces on the links of the chain 18 and 19 will respectively engage opposite sides of a common or center straight track or way 41 carried by a fixed hanger 42 in the frame 6. The approaching surfaces 38 assist in piloting or directing the continuations 36 onto the tracks. The tracks 39 and 41 also serve to prevent sagging of the lower lengths of the chains and inertia between the chains and sprockets. The tracks or ways may be constructed of any material suitable for the purpose.

If found desirable, a spacer 43 may be interposed between the hubs of the sprockets 1 and 2 and the other pairs of sprockets for maintaining them in a predetermined spaced axial relationship and/or if desired, the shoes of each adjacent pair of chains, such as the chains 18 and 18' may be connected together by transverse members or cleats 44 constituting threads. The ends of the cleats or treads are provided with countersunk apertures 45 and headed screws 46 extend therethrough and into threaded apertures provided therefor in the bottom walls of the shoes whereby to detachably secure the cleats thereto to facilitate repair and/or replacement. These cleats may be constructed of any material suitable for the purpose and if desired, may be of a length to transversely connect the pair of chains 18 and 18' to the pair 19 and 19'. It is to be understood that the cleats may be connected to all of the shoes or only to certain ones. For example, they may be arranged in groups or be alternately connected to the shoes. The arrangement may depend on whether the chains are to be utilized for traction or conveyor purposes.

Figure 5:
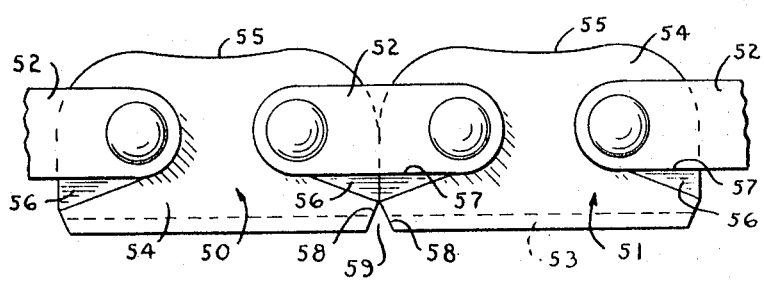
FIG. 5 is a side elevational view of a length of chain showing a modified form of shoe.
Figure 6:
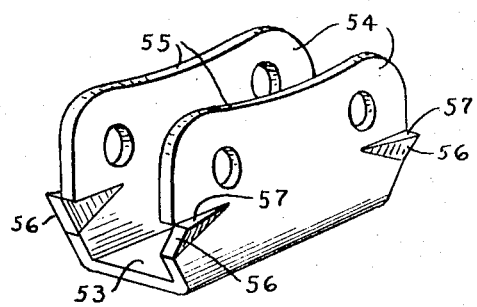
FIG. 6 is a perspective view of one of the shoes shown in FIG. 5.

As exemplified in FIGS. 5 and 6 of the drawing, there is a modified form of a chain having corresponding channel shoes generally designated 50 and 51 which are secured together by corresponding side links 52. Each of the shoes preferably includes a bottom wall 53 and sidewalls 54. The inner edges of the sidewalls are provided with arcuate surfaces 55 for engaging the annular surfaces 9 of a sprocket. These sidewalls are also preferably provided with struck-out laterally extending lugs 56 having generally triangular surfaces or abutments 57 which are adapted to be engaged by the links whereby to assist in stabilizing the operative relationship between the shoes and links and maintain the shoes correctly aligned. In other works, the shoes are maintained in a substantially straight or aligned condition, even though, for example, the chain traveling on an uneven ground surface or the load is from the top when used as a conveyor.

Attention is also directed to the fact that the bottom walls and sidewalls adjacent the ends of the shoes are preferably bevelled as respectively indicated at 58 in order to provide a gap or clearance as indicated at 59 whereby to assist in promoting an automatic cleaning action when the chains are traveling on earth, snow or ice.

Figure 8:
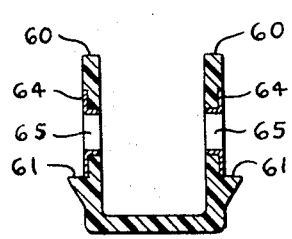
FIG. 8 is a vertical section taken substantially on line 8—8 of FIG. 8.
Figure 7:
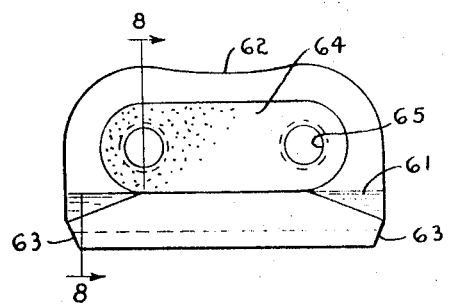
FIG. 7 is a side elevational view of a modified form of a shoe.

In FIGS. 7 and 8 of the drawing, there is shown a modified form of a shoe which may be utilized with others constitute a chain. The shoe is constructed of suitable plastic material and includes parallel sidewalls 60 provided with offsets forming abutments 61 which are similar to the abutments 57 above referred to. The sidewalls of the shoe are also provided with arcuate bearing surfaces 62 similar to the bearing surfaces 55 and with bevels 63 similar to the bevels 58 above referred to. The sidewalls are further provided with metallic inserts 64 which are molded or imbedded therein to reinforce the shoe and particularly provide aligned bearings 65 for conventional cross-pins not shown.

In view of the foregoing, it will be manifest that a single chain may include shoes of the character described for support on a pair of aligned sprockets or that a pair or pairs of chains having such shoes may be supported on pairs of sprockets for conveyor or traction purposes, When the chains are utilized for traction purposes, such as for engagement with the ground, cleats are preferably attached to the shoes. The cleats may be attached to all or only certain of the shoes. It will also be apparent that the side links 23 and tracks or ways therefor are adapted to be utilized particularly where relatively high speeds are desired in order to promote stability, alignment of components, efficiency and reduce inertia, wear, vibration and centrifugal forces.

Having thus described my invention, it is obvious that various other modifications may be made in the same without departing from the spirit of the invention and, therefore, I do not wish to be understood as limiting myself as to the exact forms, constructions, arrangements, and combinations of parts herein shown and described.

I claim:

1. A chain comprising a plurality of channel-shaped links, each of said links having a bottom wall and integrally joined sidewalls, separate elongated side connecting members disposed externally and in overlapping juxtaposed relationship with the ends of adjacent links, rollers in said channel links, cross-pins extending through said rollers, said sidewalls of said links, and said side connecting members affording pivotal connections between said side connecting members and each of said links and for holding said rollers between said sidewalls, and abutment means on said sidewalls for engaging said side connecting members for limiting pivotal movement of said links with respect to said side connecting members in one direction.

2. The chain defined in claim 1, in which said abutment means for limiting pivotal movement between the links and side connecting members comprise external abutments on the sidewalls which may be engaged by the side members.

3. The chain defined in claim 1, in which the links are nonmetallic, and metal inserts are imbedded in the sidewalls for reinforcing the same and provide tubular bearings through which the cross-pins extend.

4. In combination: a frame, a pair of parallel shafts carried by said frame, a pair of aligned sprockets respectively mounted on said shafts and having annular bearing surfaces, a chain mounted on said sprockets and having channels for substantially covering at least certain of the teeth of each sprocket when travelling thereon, said channels having sidewalls provided with curved edge portions for engagement with said bearing surfaces, a track disposed alongside lower portions of said sprockets and a lower run of said chain, and said chain being provided with extensions on said sidewalls, each extension having a lateral offset portion for engaging said track for supporting said chain when moved around said sprockets.

5. In combination: a frame, a pair of parallel shafts carried by said frame, axially aligned pairs of sprockets mounted on each shaft so that the sprockets on one shaft are aligned with the sprockets on the other shaft, said sprockets having annular bearing surfaces, chains mounted on said sprockets and having channels for substantially covering at least certain of the teeth of each sprocket when traveling thereon, said channels having sidewalls provided with curved edge portions for engaging said bearing surfaces, a pair of outer tracks respectively disposed alongside lower portions of the outermost sprockets of said pairs and the lower runs of the chains thereon, a center track disposed alongside lower portions of the innermost sprockets of said pairs and the lower runs of the chains thereon, said chains being provided with extensions on said sidewalls of said channels and each of said extensions having a lateral offset portion, and said offset portions on said outermost chains and said offset portions on said innermost chains being arranged to respectively engage said outer tracks and said center track for supporting said chains when moved around said sprockets.

6. The combination defined in claim 5, in which adjacent pairs of chains are connected by cross-members.

7. The combination defined in claim 5, in which all of said chains are connected together by cross-members.